United States Patent [19]

Nishimaki et al.

[11] Patent Number: 4,485,476

[45] Date of Patent: Nov. 27, 1984

[54] APPARATUS AND PROCESS FOR PREPARING HIGH TEMPERATURE REACTION PRODUCTS

[75] Inventors: Toshihiko Nishimaki; Yoshikazu Nakaminato; Katsuhiko Fujimoto, all of Oumi, Japan

[73] Assignee: Denki Kagaku Kogyo Kabushiki Kaisha, Tokyo, Japan

[21] Appl. No.: 505,607

[22] Filed: Jun. 20, 1983

[30] Foreign Application Priority Data

Jun. 26, 1982 [JP] Japan .............................. 57-110375

[51] Int. Cl.³ ............................................ H05B 11/00
[52] U.S. Cl. ...................................................... 373/2
[58] Field of Search ........................ 373/1, 2, 60, 79; 75/11

[56] References Cited

U.S. PATENT DOCUMENTS

| | | | |
|---|---|---|---|
| 3,197,539 | 7/1965 | Hinds | 373/2 |
| 3,459,867 | 8/1969 | Estes | 373/2 |
| 3,899,628 | 8/1975 | Hirt | 373/2 |
| 4,077,614 | 3/1978 | Udo et al. | 373/2 |
| 4,156,102 | 5/1979 | Mainot et al. | 373/2 |

Primary Examiner—Roy N. Envall, Jr.
Attorney, Agent, or Firm—Jordan and Hamburg

[57] ABSTRACT

According to the invention, there are provided improved apparatus and process for preparing high temperature reaction products in an electric furnace. Into the furnace, a combustible material and an oxygen-containing gas are fed by means of a suction-type water-cooled lance. The discharge end of the lance in the furnace is opened at a specific position within the unreacted material deposition zone in the furnace so that incomplete combustion is effected, thereby producing useful by-product gases. Cooling water is recirculated by a suction pump interposed at a position downstream of the lance outlet.

14 Claims, 3 Drawing Figures

APPARATUS AND PROCESS FOR PREPARING HIGH TEMPERATURE REACTION PRODUCTS

BACKGROUND OF THE INVENTION

1. Field of the Invention

The present invention relates to an apparatus and process for preparing high temperature reaction products, and more particularly to an apparatus and process for preparing high temperature reaction products, such as calcium carbide, ferrosilicon and calcium silicon in an electric furnace.

2. Prior Art

Various proposals have been made to supply a carbonaceous addition material in an electric furnace containing starting materials to allow the carbonaceous addition material to react with other starting materials in the high temperature environment in the furnace, thereby to improve the yields of reaction products and to decrease electric power consumption.

For example, one of the known processes involves the use of an electrical furnace provided with a hollow electrode through which carbon particles are fed in the furnace. However, the hollow electrode serves only for supplementing carbon particles therethrough, and it is not expected to improve the yields of reaction products and by-product gases or to decrease electric power consumption by the provision of such a hollow electrode.

It has been known in the art to supply a carbonaceous material and oxygen into an electric furnace at a region surrounding the electrode using a lance. However, simply by supplying a carbonaceous material and oxygen in the furnace, improvement in yields of the reaction products and by-product gases and decrease in electric power consumption could not be attained in good economical balance. In addition, the conventional lance is disadvantageous in that the lance is often defected by burning to make it difficult to continuously feed the carbonaceous material and oxygen therethrough. Although the use of a water-cooled lance is proposed, there is a risk that serious explosion accident might be induced by abruptly expanding steam in the event where the lance is defected to cause leakage of cooling water in the furnace.

OBJECTS AND SUMMARY OF THE INVENTION

It is, therefore, a primary object of this invention to provide an apparatus and process for preparing high temperature reaction products to improve the yields of high temperature reaction products and also the yields of by-product gases formed by the reaction between a combustible material and other starting materials and simultaneously to attain usually incompatible improvement in electric power factor during the production process in good balance.

Another object of this invention is to provide an apparatus and process for preparing high temperature reaction products, wherein a combustible material and an oxygen-containing gas are fed into an electric furnace in a fail-safe manner.

A further object of this invention is to provide an apparatus and process for preparing high temperature reaction products, wherein the heat generated by the reaction between a combustible material and an oxygen-containing gas is effectively utilized and the by-product gases are recovered from the reaction system.

A further object of this invention is to provide an apparatus and process for preparing high temperature reaction products, whereby the quantity of water leaking out of the lance to enter the electric furnace is minimized even when cooling water leaks through the occasionally formed defects, so that the risk of accidental explosion due to expanding steam can be excluded.

The above and other objects of this invention will be more clearly understood from the following description.

The present invention provides an improvement in an apparatus for preparing high temperature reaction products, wherein a combustible material and an oxygen-containing gas are fed into an electric furnace having at least one electrode by means of at least one suction-type water-cooled lance for effecting incomplete combustion of said combustible material and wherein the heat of reaction generated by said incomplete combustion is utilized for additional heat source for raising the temperature of the reaction zone in said furnace, the improvement wherein the discharge end of said suction-type water-cooled lance for charging said combustible material and said oxygen-containing gas is opened at a position within the unreacted material deposition zone defined by first and second imaginal hemispheres, the centers of said first and second imaginal hemispheres being identical and located on the bottom of said electric furnace intersected by the extension of longitudinal center line of said electrode, the radius of said first imaginal hemisphere being substantially equal to the distance from the tip end of said electrode to the bottom face of said electric furnace, the radius of said second imaginal hemisphere being 1.5 times as long as the radius of said first imaginal hemisphere, wherein said discharge end of said suction-type water-cooled lance is maintained at a vertical position higher than the water level in a reservoir from which cooling water is supplied, and wherein said cooling water is recirculated by a suction pump interposed in the cooling water recirculation line at a position downstream of the cooling water outlet of said suction-type water-cooled lance.

According to the present invention, there is also provided an improvement in a process for preparing high temperature reaction products, wherein a combustible material and oxygen-containing gas are fed into an electric furnace having at least one electrode by means of at least one suction-type water-cooled lance for effecting incomplete combustion of said combustible material and wherein the heat of reaction generated by said incomplete combustion is utilized for additional heat source for raising the temperature of the reaction zone in said furnace, the improvement wherein said combustible material and said oxygen-containing gas are mixed in a ratio such that the molar ratio of carbon/oxygen ranges from 1.5 to 2.5 and fed under pressure at a feed rate of not lower than 10 m/sec, and wherein the discharge end of said suction-type water-cooled lance is opened at a position within the unreacted material deposition zone defined by first and second imaginal hemispheres, the centers of said first and second imaginal hemispheres being identical and located on the bottom of said electric furnace intersected by the extension of longitudinal center line of said electrode, the radius of said first imaginal hemisphere being substantially equal to the distance from the tip end of said electrode to the bottom face of said electric furnace, and the radius of said second imaginal hemisphere being 1.5 times as long as the radius of said first imaginal hemisphere.

DESCRIPTION OF THE PREFERRED EMBODIMENT

In the following description, an embodiment of the present invention applied to an electric furnace used for the preparation of calcium carbide will be described, by way of example. However, it should be appreciated that the present invention is not limitedly applicable to such an electric furnace, but may be applied to other electric furnaces used for the production of high temperature reaction products, such as ferrosilicon, calcium silicon or like products.

Figure 1:
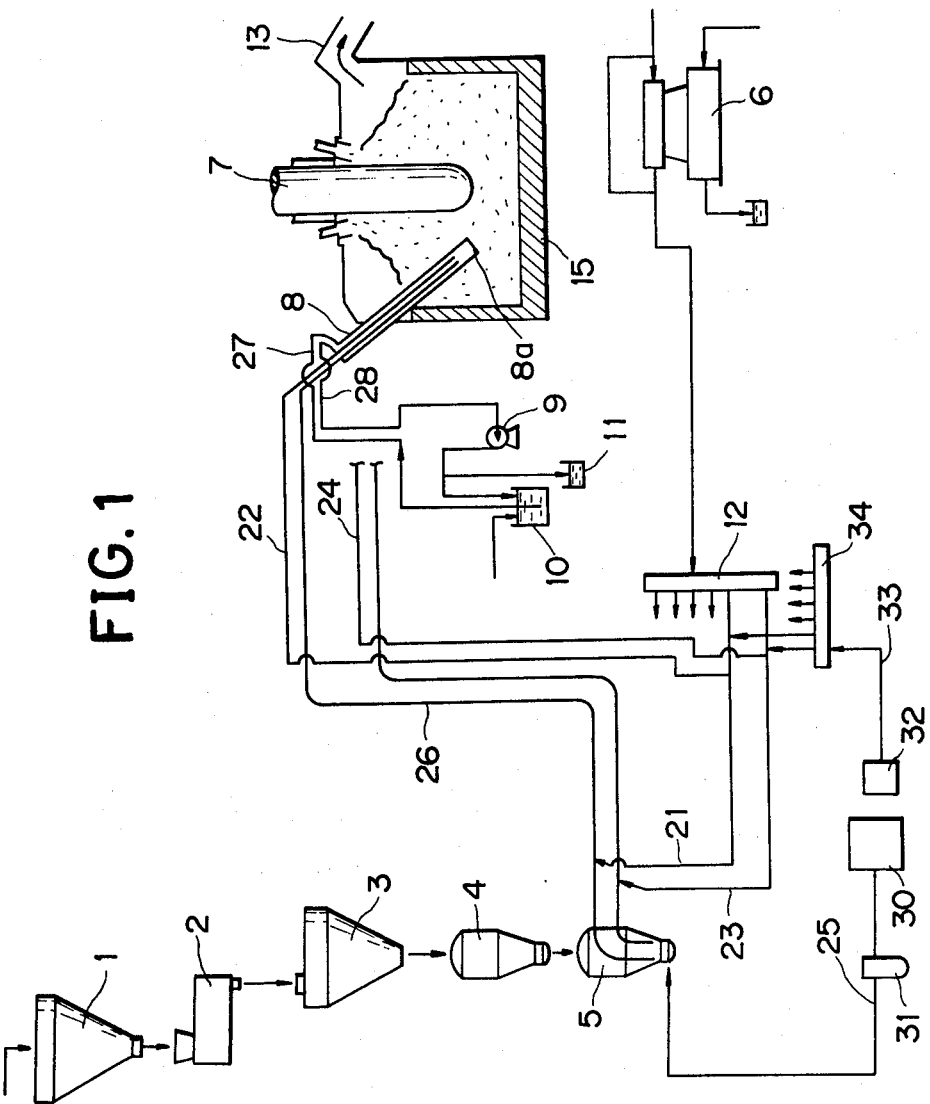
FIG. 1 is a schematic representation of one embodiment of the apparatus according to this invention.

Firstly referring to FIG. 1 powdered coal to be supplied as the combustible material from a tank 1 is sieved through a vibration sieve 2, and the particles of less than 3 mm in size are passed to a hopper 3. A pressure tank 5 is provided with a load cell operatively connected to a damper (not shown) of the hopper 3, so that a pre-set quantity of powdered coal is automatically introduced into the pressure tank 5 through another tank 4. Although powdered coal is used in this embodiment, it should be readily understood that other combustible materials, such as carbonaceous materials including cokes, gaseous fuels, liquid fuels and synthetic resins, may be used.

The pressure tank 5 is connected to a compressed air source 30 through a conduit 25. Compressed air is passed to the tank 5 through a moisure remover 31 interposed in the conduit 25. Although air is used as the oxygen-containing gas in this embodiment, oxygen or a mixture of oxygen and nitrogen or other pertinent oxygen-containing gases may be used.

Separately, air is compressed by a compressor 6 to have a pressure of not lower than 0.5 kg/cm$^2$ and then passed to a header 12. The compressed air flow supplied from the header 12 to ultimately to an electric furnace is divided and passed through a primary air conduit 21 and a secondary air conduit 22. The primary air passing through the primary air conduit 21 is mixed with the powdered coal at an outlet of the pressure tank 5 to be passed through a conduit 26 to a lance 8. The lance 8 may be made of an ordinary steel, stainless steel or graphite.

The air flowing through the secondary air conduit 22 enters directly into the lance 8 where the air is fully mixed with the powdered coal to be fed into a furnace 15. When a plurality of lances 8 are used (see FIG. 3), corresponding numbers of primary and secondary air conduits may be provided and connected to respective lances to feed the mixture of air and powdered coal, although only two primary air conduits 21, 23 and two secondary air conduits 22, 24 are shown in FIG. 1. For simlification of illustration, FIG. 1 shows one electrode 7 and one lance 8 for injecting the mixture of air and powdered coal in the neighbourhood of the electrode 7. Although not restricted, it is preferred that three electrodes be provided in an electric furnace when a three phase AC current power source is used and that a pair of lances disposed in both sides of each electrode is provided to inject the mixture of air and powdered coal (see FIG. 3).

The feed rate of powdered coal injected into the furnace 15 is determined by the flow rates of primary air flowing through the primary air conduits 21, 23 and the pre-set pressure value in the pressure tank 5.

The construction and operation of the lance 8 will be described in detail. The lance 8 is a suction-type water-cooled lance, and cooling water is supplied from a water reservoir 10 which is positioned such that the water level therein is lower than the vertical position or height of the discharge end 8a of the lance 8. The cooling water is forced to flow through a conduit 27, the lance 8 and return conduit 28, by the action of a suction pump 9 disposed downstream of the lance 8, back to the water reservoir 10. In normal operation, cooling water is recirculated through the aforementioned recirculation passage. When the temperature of water in the return conduit 28 becomes too high, water flowing through the return conduit 28 may be dispensed through a water discharge pit 11 and fresh cold water may be supplemented. In the event where any defect causing water leakage from the lance 8 occurs, cooling water in the conduit 27 and cooling water in the lance 8 return to the water reservoir automatically by siphonage. Further, since the pump 9 is disposed downstream of the lance 8, cooling water in the lance 8 and cooling water in the conduit 28 can rapidly and reliably leave the furnace to exclude the risk that a significant quantity of leaked cooling water is charged in the high temperature furnace 15. The primary air conduits 21 and 23 are connected to an emergency feed line including an inert gas source 32, a conduit 33 and a header 34. The emergency feed line is shut out from the system during normal operation, but in the event of emergency an inert gas, such as nitrogen, is fed from the inert gas source 32 through the conduit 33 and the header 34 to the conduits 21 and 23 in place of the mixture of combustible material and air, in order to secure safety even when the lance 8 is damaged. In order to obviate terrible explosion accident caused by water leakage from the lance 8, the return conduit 28 may further be provided with malfunction sensing apparatus (not shown), such as a foam sensor, a device for sensing abnormal pressure or a device for sensing abnormal flow rate, to generate a signal for automatically stopping the suction pump 9, whereby the accident otherwise might be induced by the defects of the water-cooled lance 8 can be completely excluded.

Figure 2:
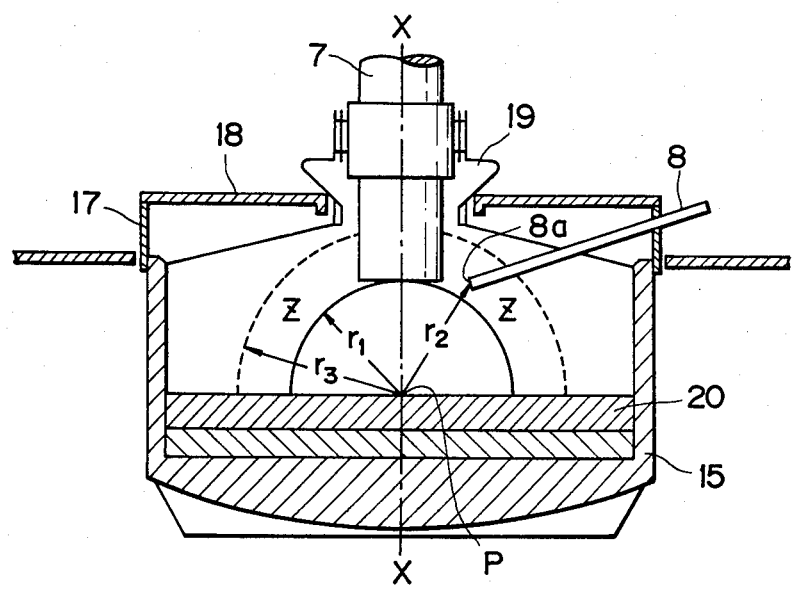
FIG. 2 is a sectional view, taken along a vertical plane, of the electric furnace incorporated in one embodiment of the apparatus according to this invention, wherein a suction-type water-cooled lance is shown somewhat schematically with real and dotted line circles representing imaginal hemispheres defining the zone within which the discharge end of the lance is opened.

Referring to FIG. 2 showing schematically the section of the electric furnace 15 used for the production of calcium carbide, a shaft 19 surrounds the electrode 7 to supply a mixture of lime and powdered coal therethrough.

The electric furnace used in this invention may be any one of closed type, semi-closed type and open type furnaces. A closed type furnace is conveniently used when complete recovery of the by-product gases, such as carbon monoxide, is desired. However, the by-product gases may be recovered by the known technology when a semi-closed type or open type furnace is used.

The feed rate of powdered coal from the lance 8 to the electric furnace 15 is varied depending on the loading of the furnace, the sorts and particle sizes of the starting materials and the position of the discharge end of the lance 8, and generally ranges within 10 to 50 wt %, preferably within 15 to 40 wt %, and more preferably within 20 to 30 wt %, based on the yield of the produced calcium carbide.

The feed rate of powdered coal from the lance 8 should be higher than the backfire rate, namely higher than 10 m/sec, to obviate the risk of explosion and to ensure safe operation. The powdered coal may be fed at a pressure of not lower than 0.5 kg/cm$^2$, and it is preferred that the pressure applied for feeding the powdered coal be maintained at a pressure value higher than the internal pressure in the electric furnace.

In the present invention, the heat of reaction generated from the incomplete reaction between the powdered coal and air, the reaction being represented by the following reaction equation, is effectively utilized for the production of calcium carbide, and the by-product carbon monoxide gas is recovered.

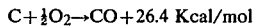

$$C + \tfrac{1}{2}O_2 \rightarrow CO + 26.4 \text{ Kcal/mol}$$

It is essential that the molar ratio of carbon/oxygen in the combustible mixture containing powdered coal be maintained in the range of 1.5 to 2.5 in order to attain a good result. If the molar ratio of carbon/oxygen is less than 1.5, the quantities of useful by-products gases (CO+H$_2$) are decreased with increase in quantity of useless carbon dioxide, and the temperature in the furnace is lowered considerably. On the contrary, if the molar ratio of carbon/oxygen exceeds 2.5, the temperature in the furnace is lowered although the quantities of useful by-product gases are increased.

Now referring back to FIG. 2, the top opening between the shaft 19 surrounding the electrode 7 and a side cover wall 17 of the furnace 15 is closed by a lid 18. The lance 8 is inserted through the side cover wall 17 with its discharge end 8a positioned within the unreacted material deposition zone Z defined or enclosed by first and second imaginal hemispheres. The centers of the first and second imaginal hemispheres are coincident with each other and located at the point P on the bottom 20 of the furnace 15 intersected by the extension of longitudinal or vertical center line X—X of the electrode 7. The radius $r_1$ of the first imaginal hemisphere is substantially equal to the distance from the tip end of the electrode 7 to the point P, and the radius $r_3$ of the second imaginal hemisphere is about 1.5 times long as the radius $r_1$ of the first imaginal hemisphere. Let the distance from the discharge end 8a of the lance 8 to the point P be $r_2$, as shown in FIG. 2, the interrelation between $r_1$, $r_2$ and $r_3$ should be $r_1 < r_2 < r_3$.

The position of the discharge end 8a of the lance 8 be limited as aforementioned and as defined throughout the appended claims, according to the invention, because it has been found that the once formed calcium carbide in the calcium carbide formation zone, which is maintained at a temperature of 2000° C. or even higher and occupies the region just beneath the electrode, tends to be oxidized by injected oxygen leading to reduction in yeild of the product calcium carbide if the discharge end of the lance is thrusted excessively deeper into the calcium carbide formation zone. It is also found that positioning of the discharge end of the lance at a position outside of the zone enclosed by the second imaginal hemisphere having the radius of $r_3$ as defined above causes disadvantageous reduction in thermal efficiency or detrimental blow-by phenomenon due to thinness of the starting material layer covering the discharge end, nevertheless the temperature condition, in the order of about 1000° C., in the region outside of the second imaginal hemisphere is better for the prevention of oxydation of calcium carbide. The mixture of powdered coal and air should be injected or blown into the furnace from the position satisfying the aforementioned principal condition. A particularly satisfactory result may be obtained when the discharge end 8a of the lance 8 is maintained at a level substantially same as the height of the tip end of the electrode 7, i.e. the discharge end 8a of the lance 8 is spaced from the bottom face 20 of the furnace 15 by a vertical distance substantially equal to $r_1$.

Figure 3:
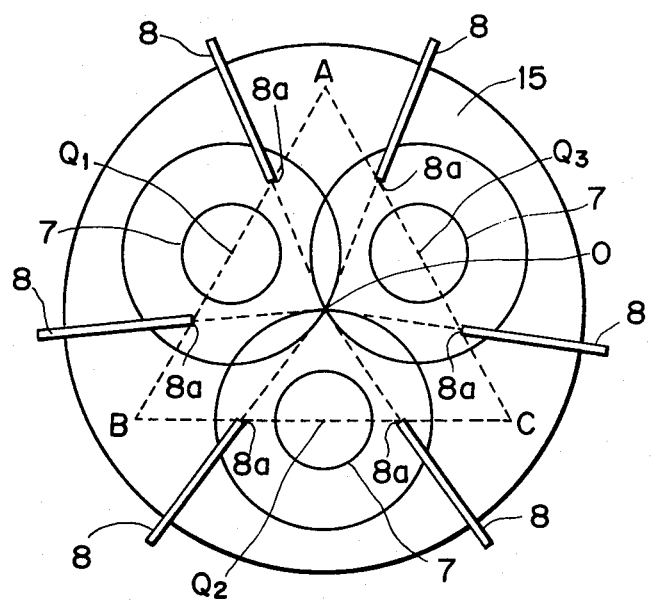
FIG. 3 is a sectional view, taken along a horizontal plane, of the electric furnace incorporated in one embodiment of the apparatus according to this invention, wherein six lances are shown somewhat schematically with real line circles showing imaginal circles in which the discharge ends of the lances are opened and with dotted lines showing an imaginal regular triangle along the latera of which the discharge ends of the lances are positioned.

Referring to FIG. 3, the electric furnace 15 is provided with three electrodes 7, six lances 8 are disposed in the furnace 15 while being oriented such that the extensions of respective lances direct to the center O of the horizontally extending sectional plane enclosed by the inner periphery of the furnace. It is preferred that the three electrodes be disposed such that the centers of respective electrodes are equi-spaced from the center of the horizontal plane defined by the inner periphery of the furnace and arranged about the center O at equal interval with each other, so that an imaginal regular triangle ABC with its center coincident with the center O with its three latera or sides pass over or extend through the centers $Q_1$, $Q_2$ and $Q_3$ of respective electrodes be constructed. It has been found that a particularly good result may be obtained by positioning the discharge ends 8a of the lance 8 substantially on the points along respective sides AB, BC and CA and contained within the circles drawn with their centers at the centers $Q_1$, $Q_2$ and $Q_3$ and with their radii equal to the distance from the center O to respective electrode centers $Q_1$, $Q_2$ and $Q_3$. With this arrangement, direct injection of the mixture of the combustible material and the oxygen-containing gas to the high temperature calcium carbine formation zone can be obviated. The off-gas may be discharged through a discharge conduit 13 (see FIG. 1).

The unreacted material zone into which the mixture of combustible material and the oxygen-containing gas is injected in accordance with the present invention, is generally heated to a high temperature ranging from about 800° C. to 2000° C. with some temperature gradient. As the lance is thrusted closer to the high temperature reaction product formation zone, the reaction speed becomes higher so that the feed rate of the mixture injected from the lance may be increased correspondingly. The feed rate of the mixture injected from the lance may be increased in consideration of the grade of resultant gas mixture, for example the concentration of CO in the mixture, and the quantity or rate of generated gas mixture.

As will be clear from the foregoing, according to the present invention, a mixture of a combustible material and an oxygen-containing gas is injected into an electric furnace through one or more lances having the discharge ends positioned or opened within the specifically defined zone to utilize the heat of reaction more efficiently thereby to decrease the electric power factor and simultaneously to recover the by-product gases. A further important feature of this invention resides in that safe operation is ensured by the provision of a suction-type water-cooled lance wherein the cooling water is sucked by a pump disposed downstream of the lance.

EXAMPLES OF THE INVENTION

The present invention will now be described more specifically by referring to examples and reference examples. Throughout the following Examples, and Comparative Examples, the apparatus shown in FIGS. 1 to 3 was used and mixtures of the combustible materials and oxygen were fed through the lances at a pressure of 2 kg/cm² and at a feed speed of 24 m/sec to 30 m/sec, the feed speed being controlled depending on the conditions in the furnace. Throughout the following description and Tables, "%" and "part" stand for "% by weight" and "part by weight" unless otherwise specified.

EXAMPLES 1 TO 3; COMPARATIVE EXAMPLES 1 and 2

In a calcium carbide production electric furnace having a transformer capacity of 30000 KVA, calcium carbide was prepared while feeding coke powders carried by an oxygen-containing gas consisting of 85 vol % oxygen and 15 vol % of nitrogen through water-cooled lances made of boiler grade steel pipes.

The distance from the bottom face of the furnace to the tip end of each electrode was 1.8 meters, and the distance from the point P (see FIG. 2) to the discharge end of each lance was set to 2.25 meters in Example 1 and to 1.98 meters in Examples 2 and 3. The distance of 2.25 meters in Example 1 corresponds 1.25 times as long as the distance from the bottom face of the furnace to the tip end of each electrode, and the distance of 1.98 meters in Example 2 or 3 corresponds 1.1 times as long as the distance from the bottom face of the furnace to the tip end of each electrode.

For the comparison purpose, the furnace was operated without feeding coke powders and oxygen (Comparative Example 1), and the furnace was operated with the lances positioned to have their discharge ends just beneath the electrodes and outside of the zone defined by the invention (Comparative Example 2).

The conditions and results of the Examples 1 to 3 and Comparative Examples 1 and 2 are shown in Table 1.

TABLE 1

| | | Position of Discharge End of Lance | | | | |
|---|---|---|---|---|---|---|
| | | Example | | | Comparative Example | |
| | Test Items | 1<br>1.25 times | 2<br>1.1 times | 3<br>1.1 times | 1<br>None | 2<br>High temp. portion |
| Conditions | Charge Rate of Powdered Cokes (Kg/Hr) | 773 | 663 | 1,620 | — | 647 |
| | Charge Rate of Oxygen Gas (Nm³/Hr) | 655 | 702 | 1,640 | — | 685 |
| | Molar Ratio (C/O₂) | 2.3 | 1.9 | 2.0 | — | 1.9 |
| | Loaded Electric Power (KWH) | 24,800 | 15,300 | 20,000 | 24,100 | 17,500 |
| Results | Rate of Generated By-product Gases (m³/ton carbide) | 589 | 686 | 838 | 447 | 720 |
| | (Nm³/Hr) | 5,040 | 3,748 | 6,201 | 3,594 | 3,360 |
| | Yield of Carbide (ton/Hr) | 8,552 | 5,464 | 7,462 | 8,036 | 4,667 |
| | Concentration of By-product Gases* (Vol %) CO | 65.6 | 71.6 | 74.6 | 67.2 | 72.5 |
| | CO₂ | 5.2 | 2.6 | 3.2 | 1.7 | 1.8 |
| | Electric Power Factor (KWH/ton) | 2,900 | 2,800 | 2,680 | 2,999 | 3,750 |

*Note:
The concentrations of the gases other than CO and CO₂ were, respectively, H₂ = about 20 vol %, N₂ = 5 to 7 vol %, CH₄ = about 1 vol %, and O₂ = about 0.3 vol %.

As will be clear from the results set forth in Table 1, Examples of the invention gave the results superior to those of the Comparative Examples, in that the yield of carbide was increased with reduced electric power factor and the yield of useful gas content was also increased.

EXAMPLE 4 to 8

Experimental operations were conducted similarly to Examples 1 to 3, except that the operation parameters specifically set forth in the following Table 2 were changed. The conditions and results are shown in Table 2.

The carbonaceous material (powdered coke) used in these Examples had a moisure content of 2%, and a fixed carbon content of 92%. The oxygen gas as referred to in Table 2 means a mixture containing 85 vol % of oxygen and 15 vol % of nitrogen.

TABLE 2

| | | Example | | | | |
|---|---|---|---|---|---|---|
| | | 4 | 5 | 6 | 7 | 8 |
| Conditions | Position of Discharged End of Lance (times) | 1.25 | 1.10 | 1.10 | 1.10 | 1.10 |
| | Loaded Electric Power (KWH) | 22,000 | 22,050 | 19,950 | 20,800 | 20,100 |
| | Molar Ratio (C/O₂) | 2.0 | 1.5 | 1.7 | 2.0 | 2.0 |
| | Charge Rate of Powdered Cokes (Kg/Hr) | 1,657 | 1,243 | 1,408 | 1,657 | 829 |
| | Charge Rate of Oxygen Gas (Nm³/Hr) | 1,640 | 1,640 | 1,640 | 1,640 | 820 |

TABLE 2-continued

| | | Example | | | | |
|---|---|---|---|---|---|---|
| | | 4 | 5 | 6 | 7 | 8 |
| Results | Rate of Generated By-product Gases | Rate of Generated Gas (Nm$^3$/Hr) | 6,203 | 6,384 | 6,408 | 6,446 | 4,877 |
| | | Rate Factor (Nm$^3$/ton carbide) | 813 | 807 | 810 | 815 | 640 |
| | Concentration of By-product Gases* | CO (vol %) | 75.2 | 76.2 | 76.6 | 77.3 | 75.0 |
| | | CO$_2$ (vol %) | 5.2 | 4.2 | 3.8 | 3.2 | 2.6 |
| | Yield of Carbide (ton/Hr) | | 7,631 | 7,808 | 7,880 | 7,906 | 7,620 |
| | Electric Power Factor (KWH/ton) | | 2,883 | 2,824 | 2,530 | 2,640 | 2,887 |

*Note:
The concentrations of other gases were similar to those as set forth in the Note appended to Table 1.

In the foregoing description, the present invention has been specifically disclosed by referring to some examples thereof. However, it should be appreciated that various modifications and variations can be easily made by those skilled in the art without departing from the spirit of the invention. It is, thus, intended to include all such modifications and variations within the wide scope of the present invention defined by the appended claims.

What is claimed is:

1. In an apparatus for preparing high temperature reaction products, wherein a combustible material and an oxygen-containing gas are fed into an electric furnace having at least one electrode by means of at least one suction-type water-cooled lance for effecting incomplete combustion of said combustible material and wherein the heat of reaction generated by said incomplete combustion is utilized for additional heat source for raising the temperature of the reaction zone in said furnace, an improved apparatus wherein the discharge end of said suction-type water-cooled lance for charging said combustible material and said oxygen-containing gas is opened at a position within the unreacted material deposition zone defined by first and second imaginal hemispheres, the centers of said first and second imaginal hemispheres being identical and located on the bottom of said electric furnace intersected by the extension of longitudinal center line of said electrode, the radius of said first imaginal hemisphere being substantially equal to the distance from the tip end of said electrode to the bottom face of said electric furnace, the radius of said second imaginal hemisphere being 1.5 times as long as the radius of said first imaginal hemisphere, wherein said discharge end of said suction-type water-cooled lance is maintained at a vertical position higher than the water level in a reservoir from which cooling water is supplied, and wherein said cooling water is recirculated by a suction pump interposed in the cooling water recirculation line at a position downstream of the cooling water outlet of said suction-type water-cooled lance.

2. The apparatus according to claim 1, wherein said lance is connected to a feed line including tank means for receiving said combustible material and said oxygen-containing gas to pass them under pressurized condition, means for feeding said oxygen-containing gas into said tank means, and conduit means for transferring said combustible material together with said oxygen-containing gas to said lance.

3. The apparatus according to claim 2, wherein said feed line further includes additional means for feeding said oxygen-containing gas directly into said conduit means.

4. The apparatus according to claim 2, wherein said lance is connected to a separate feed line for feeding said oxygen-containing gas directly into said lance.

5. The apparatus according to claim 2, wherein said conduit means is connected to a normally shut-out emergency feed line for feeding an inert gas when any malfunction or overheating of said electric furnace is sensed.

6. The apparatus according to claim 1, wherein said cooling water recirculation line is provided with means for monitoring the flow of said cooling water, and means for stopping said suction pump when any abnormal flow in said cooling water recirculation line is sensed.

7. The apparatus according to claim 1, wherein said cooling water recirculation line is provided with a pit for receiving at least a portion of recirculating water passed from said lance temporarily before delivery to said reservoir.

8. The apparatus according to claim 1, wherein a plurality of lances are disposed in said electric furnace and oriented such that the flows of said combustible material together with said oxygen-containing gas discharged from respective lances are directed to the substantial center of the horizontal plane defined by the inner periphery of said electric furnace.

9. The apparatus according to claim 1, wherein said electric furnace has three electrodes equi-spaced from the center of the horizontal plane defined by the inner periphery of said electric furnace, and wherein a plurality of lances are disposed in said electric furnace and oriented such that the flows of said combustible material together with said oxygen-containing gas discharged from respective lances are directed to the substantial center of the horizontal plane defined by the inner periphery of said electric furnace, the discharge end of each lance being opened at a position substantially along one of three latera of the imaginal regular triangle constructed with its center at the center of the horizontal plane defined by the inner periphery of said electric furnace, each of said three latera extending through the center of each one of said three electrodes, and said position of said discharge end of each lance being within the area encircled by a circle drawn with its center at the center of each electrode and with a radius equal to the distance from the center of the electrode to the center of the horizontal plane defined by the inner periphery of said electric furnace.

10. The apparatus according to claim 1, wherein said discharge end of said lance is maintained at a vertical position substantially level with the tip end of said electrode.

11. In a process for preparing high temperature reaction products, wherein a combustible material and oxygen-containing gas are fed into an electric furnace having at least one electrode by means of at least one suction-type water-cooled lance for effecting incomplete combustion of said combustible material and wherein the heat of reaction generated by said incomplete combustion is utilized for additional heat source for raising the temperature of the reaction zone in said furnace, an improved process wherein said combustible material and said oxygen-containing gas are mixed in a ratio such that the molar ratio of carbon/oxygen ranges from 1.5 to 2.5 and fed under pressure at a feed rate of not lower than 10 m/sec, and wherein the discharge end of said suction-type water-cooled lance is opened at a position within the unreacted material deposition zone defined by first and second imaginal hexispheres, the centers of said first and second imaginal hemispheres being identical and located on the bottom of said electric furnace intersected by the extension of longitudinal center line of said electrode, the radius of said first imaginal hemisphere being substantially equal to the distance from the tip end of said electrode to the bottom face of said electric furnace, and the radius of said second imaginal hemisphere being 1.5 times as long as the radius of said first imaginal hemisphere.

12. The process according to claim 11, wherein said combustible material is selected from the group consisting of powdered coals, cokes, liquid fuels, gaseous fuels and synthetic resins.

13. The process according to claim 11, wherein said combustible material and said oxygen-containing gas are fed at a pressure of not lower than 0.5 kg/cm$^2$ and higher than the internal pressure within said electric furnace.

14. The process according to claim 11, wherein the temperature of said unreacted material deposition zone ranges from 800° to 2000° C.

* * * * *